(12) United States Patent
Wakao et al.

(10) Patent No.: US 8,037,543 B2
(45) Date of Patent: Oct. 11, 2011

(54) IMAGE PROCESSING APPARATUS, IMAGE PROCESSING METHOD, COMPUTER PROGRAM AND COMPUTER-READABLE RECORDING MEDIUM

(75) Inventors: Satoru Wakao, Yokohama (JP); Hiroki Yamashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/753,273

(22) Filed: Apr. 2, 2010

(65) Prior Publication Data

US 2010/0186096 A1 Jul. 22, 2010

Related U.S. Application Data

(63) Continuation of application No. 10/830,180, filed on Apr. 22, 2004, now Pat. No. 7,716,747.

(30) Foreign Application Priority Data

Apr. 25, 2003 (JP) ................................. 2003-122939

(51) Int. Cl.
*G06F 7/04* (2006.01)

(52) U.S. Cl. ............... 726/30; 726/26; 726/27; 713/189

(58) Field of Classification Search ........................ None
See application file for complete search history.

(56) References Cited

U.S. PATENT DOCUMENTS

| | | | | |
|---|---|---|---|---|
| 5,499,294 A | * | 3/1996 | Friedman | 713/179 |
| 5,574,787 A | * | 11/1996 | Ryan | 380/201 |
| 5,646,997 A | * | 7/1997 | Barton | 713/176 |
| 6,269,446 B1 | * | 7/2001 | Schumacher et al. | 713/176 |
| 6,434,538 B1 | * | 8/2002 | Ibaraki et al. | 705/57 |
| 6,636,844 B2 | * | 10/2003 | Yoneyama | 1/1 |
| 6,968,058 B1 | * | 11/2005 | Kondoh et al. | 380/200 |
| 7,154,535 B2 | * | 12/2006 | Yamasaki et al. | 348/207.1 |
| 7,236,596 B2 | * | 6/2007 | Prokoski | 380/258 |
| 7,299,494 B2 | * | 11/2007 | Katsuda | 726/7 |
| 7,716,747 B2 | * | 5/2010 | Wakao et al. | 726/30 |
| 2001/0037454 A1 | * | 11/2001 | Botti et al. | 713/176 |
| 2002/0052988 A1 | * | 5/2002 | Yoneyama | 710/58 |
| 2002/0055942 A1 | * | 5/2002 | Reynolds | 707/200 |
| 2002/0093573 A1 | * | 7/2002 | Cromer et al. | 348/231 |
| 2004/0013268 A1 | * | 1/2004 | de Queiroz | 380/201 |
| 2004/0039929 A1 | * | 2/2004 | Decime | 713/193 |
| 2004/0133550 A1 | * | 7/2004 | Okamura | 707/1 |
| 2005/0044084 A1 | * | 2/2005 | Huang | 707/100 |
| 2005/0138370 A1 | * | 6/2005 | Goud et al. | 713/164 |

* cited by examiner

*Primary Examiner* — Ponnoreay Pich

(74) *Attorney, Agent, or Firm* — Cowan, Liebowitz & Latman, P.C.

(57) ABSTRACT

An image processing apparatus includes an alteration unit and a control unit. The alteration unit alters a first image file stored in a removable storage medium in order to generate a second image file. The control unit controls to store the second image file in the storage medium without deleting the first image file from the storage medium, if the first image file includes authentication data that is used to authenticate whether the first image file has been altered.

27 Claims, 17 Drawing Sheets

FIG. 13

| MAC(10) | DIGITAL SIGNATURE(7) | OTHERS(3) | | | | | | | |
|---|---|---|---|---|---|---|---|---|---|
| THUMBNAIL | FILE NAME | DATE OF IMAGE SENSING | SHUTTER SPEED | APERTURE VALUE | ISO SENSITIVITY | SIZE | MODEL NAME | CAMERA ID | AUTHENTI-CATION RESULT |
| ☾ | IMG_0021.JPG | 2002.12.11 13:43:27 | 1/800 | 5.6 | 100 | 1M | EOS XX | FE0001 | |
| 👥 | IMG_0022.TIF | 2002.12.11 13:43:32 | 1/800 | 5.6 | 100 | 2M | EOS XX | FE0001 | |
| ☀ | IMG_0023.JPG | 2002.12.11 13:46:36 | 1/1000 | 5.6 | 400 | 8M | EOS XX | FE0001 | |
| · · · · | · · · · | · · · · | · · · · | · · · · | · · · · | · · · · | · · · · | · · · · | · · · · |

TOTAL NUMBER OF FILES : 20

START AUTHENTICATION

FIG. 16

| | | | | | | | | | |
|---|---|---|---|---|---|---|---|---|---|
| MAC(10) | DIGITAL SIGNATURE(7) | | OTHERS(3) | | | | | | |

| THUMBNAIL | FILE NAME | DATE OF IMAGE SENSING | SHUTTER SPEED | APERTURE VALUE | ISO SENSITIVITY | SIZE | MODEL NAME | CAMERA ID | AUTHENTI-CATION RESULT |
|---|---|---|---|---|---|---|---|---|---|
| ☺ | IMG_0001.JPG | 2002.12.01 10:40:17 | 1/800 | 5.6 | 100 | 1M | EOS XX | FE0001 | OK |
| ✗ | IMG_0002.TIF | | | | | | | | NG |
| ☾ | IMG_0003.JPG | 2002.12.01 10:46:12 | 1/1000 | 5.6 | 400 | 8M | EOS XX | FE0001 | OK |
| .... | .... | .... | .... | .... | .... | .... | .... | .... | .... |

TOTAL NUMBER OF FILES : 20

START AUTHENTICATION

FIG. 17

| THUMBNAIL | FILE NAME | DATE OF IMAGE SENSING | SHUTTER SPEED | APERTURE VALUE | ISO SENSITIVITY | SIZE | MODEL NAME | CAMERA ID | AUTHENTI-CATION RESULT |
|---|---|---|---|---|---|---|---|---|---|
| ☽ | IMG_0021.JPG | 2002.12.11 13:43:27 | 1/800 | 5.6 | 100 | 1M | EOS XX | FE0001 | OK |
| ✕ | IMG_0022.TIF | | | | | | | | NG |
| ☀ | IMG_0023.JPG | 2002.12.11 13:46:36 | 1/1000 | 5.6 | 400 | 8M | EOS XX | FE0001 | OK |
| .... | .... | .... | .... | .... | .... | .... | .... | .... | .... |

MAC(10)  DIGITAL SIGNATURE(7)  OTHERS(3)

TOTAL NUMBER OF FILES : 20

START AUTHENTICATION

IMAGE PROCESSING APPARATUS, IMAGE PROCESSING METHOD, COMPUTER PROGRAM AND COMPUTER-READABLE RECORDING MEDIUM

CROSS-REFERENCE TO RELATED APPLICATION

This application is a continuation of application Ser. No. 10/830,180, filed Apr. 22, 2004 now U.S. Pat. No. 7,716,747, the entire disclosure of which is hereby incorporated by reference.

CLAIM OF PRIORITY

The present application claims priority under 35 U.S.C. §119 from Japanese Patent Application No. 2003-122939, entitled "Image Processing Apparatus and Method, A Computer Program and A Computer Readable Recording Medium" and filed on Apr. 25, 2003, the entire contents of which are hereby incorporated by reference herein.

FIELD OF THE INVENTION

The present invention relates to an image processing apparatus, an image processing method, a computer program and a computer-readable recording medium for altering the contents of an image file (at least one of a digital image or its additional information).

BACKGROUND OF THE INVENTION

Recently, proposed is a system to authenticate alteration of image data generated by an image sensing apparatus such as a digital camera as disclosed in U.S. Pat. No. 5,499,294 (hereinbelow, US'294) and Japanese Published Unexamined Patent Application No. 2002-244924 (hereinbelow, JP'924).

Further, Japanese Published Unexamined Patent Application No. 2001-78142 (hereinbelow, JP'142) discloses an apparatus which prohibits alteration of the contents of an image file if image-file authentication data is embedded in the image file. The authentication data means data necessary for determining whether or not the image file has been altered. The data is defined as "feature data" in JP'142.

However, in the apparatus in JP'142, as alteration of the content of image file with authentication data is prohibited, the contents of the image file, even if require alteration, cannot be altered. Further, if the image file with authentication data is altered, it is determined that the original of the image file has been altered.

SUMMARY OF THE INVENTION

The present invention has been made in consideration of these problems, and provides an image processing apparatus, an image processing method, a computer program and a computer-readable recording medium for altering the contents of image file with authentication data without alteration of the original of the image file.

Accordingly, provided is an image processing apparatus comprising alteration means for altering the content of a first image file, read from a recording medium, in accordance with a user's instruction, and generating a second image file; and control means for, if authentication data is added to the first image file, recording the second image file onto the recording medium without deleting the first image file.

Further, provided is an image processing method an alteration step of altering the content of a first image file, read from a recording medium, in accordance with a user's instruction, and generating a second image file; and a control step of, if authentication data is added to the first image file, recording the second image file onto the recording medium without deleting the first image file.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is an example of a screen display image showing a "digital signature" group list (before authentication);

FIG. 16 is an example of a screen display image showing the "MAC" group list (after authentication); and FIG. 17 is an example of a screen display image showing the "digital signature" group list (after authentication).

DETAILED DESCRIPTION OF THE PREFERRED EMBODIMENTS

Preferred embodiments of the present invention will now be described in detail in accordance with the accompanying drawings.

First Embodiment

Figure 1:
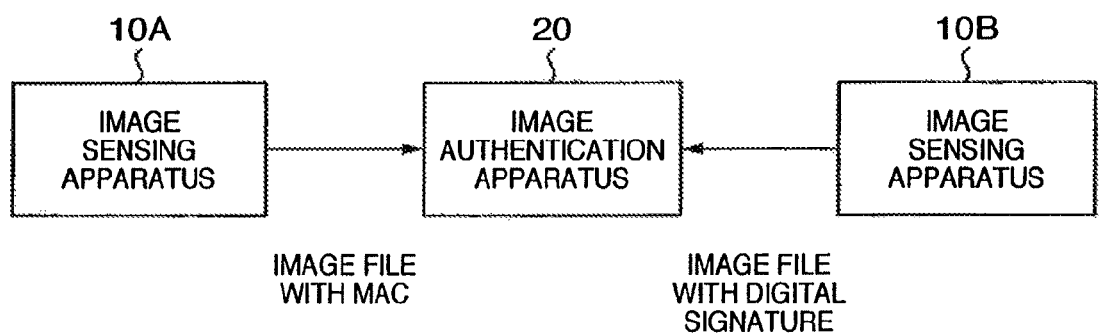
FIG. 1 is a block diagram showing principal constituent elements of an image authentication system according to a first embodiment of the present invention.

First, principal constituent elements of an image authentication system to which an image processing apparatus according to a first embodiment is applied will be described with reference to FIG. 1.

An image sensing apparatus 10A generates an image file with MAC (Message Authentication Code) from a digital image obtained by image-sensing a subject by a user, and stores the generated image file with MAC onto a removable recording medium (memory card or the like) or a recording medium of an external device. The image sensing apparatus 10A is realized with a digital camera, a digital video camera, a cellular phone with a camera, a scanner, a copying machine or the like.

Further, the image sensing apparatus 10A has a function of altering the contents of an image file with MAC, in accordance with alteration processing selected by the user, without alteration of the original of the image file. The function will be described later with reference to FIG. 5.

An image sensing apparatus 10B generates an image file with digital signature from a digital image obtained by image-sensing a subject by the user, and stores the generated image file with digital signature onto a removable recording medium (memory card or the like) or a recording medium of an external device. The image sensing apparatus 10B is realized with a digital camera, a digital video camera, a cellular phone with camera, a scanner, a copying machine or the like, as in the case of the image sensing apparatus 10A.

Further, the image sensing apparatus 10B has a function of altering the contents of an image file with digital signature, in accordance with alteration processing selected by the user, without alteration of the original of the image file. The function will be described later with reference to FIG. 9.

An image authentication apparatus 20 has a function of authenticating whether or not an image file with MAC generated by the image sensing apparatus 10A or an image file with digital signature generated by the image sensing apparatus 10B has been altered, and a function of notifying the result of authentication to the user. Further, the image authentication apparatus 20 also has a function of notifying additional information (a thumbnail image, date of image sensing, a shutter speed, an aperture value, ISO sensitivity, a model name, a product number and the like) of the image file with MAC or the image file with digital signature to the user. These functions are realized in accordance with an image authentication program stored in a program memory in the image authentication apparatus 20.

Figure 2:
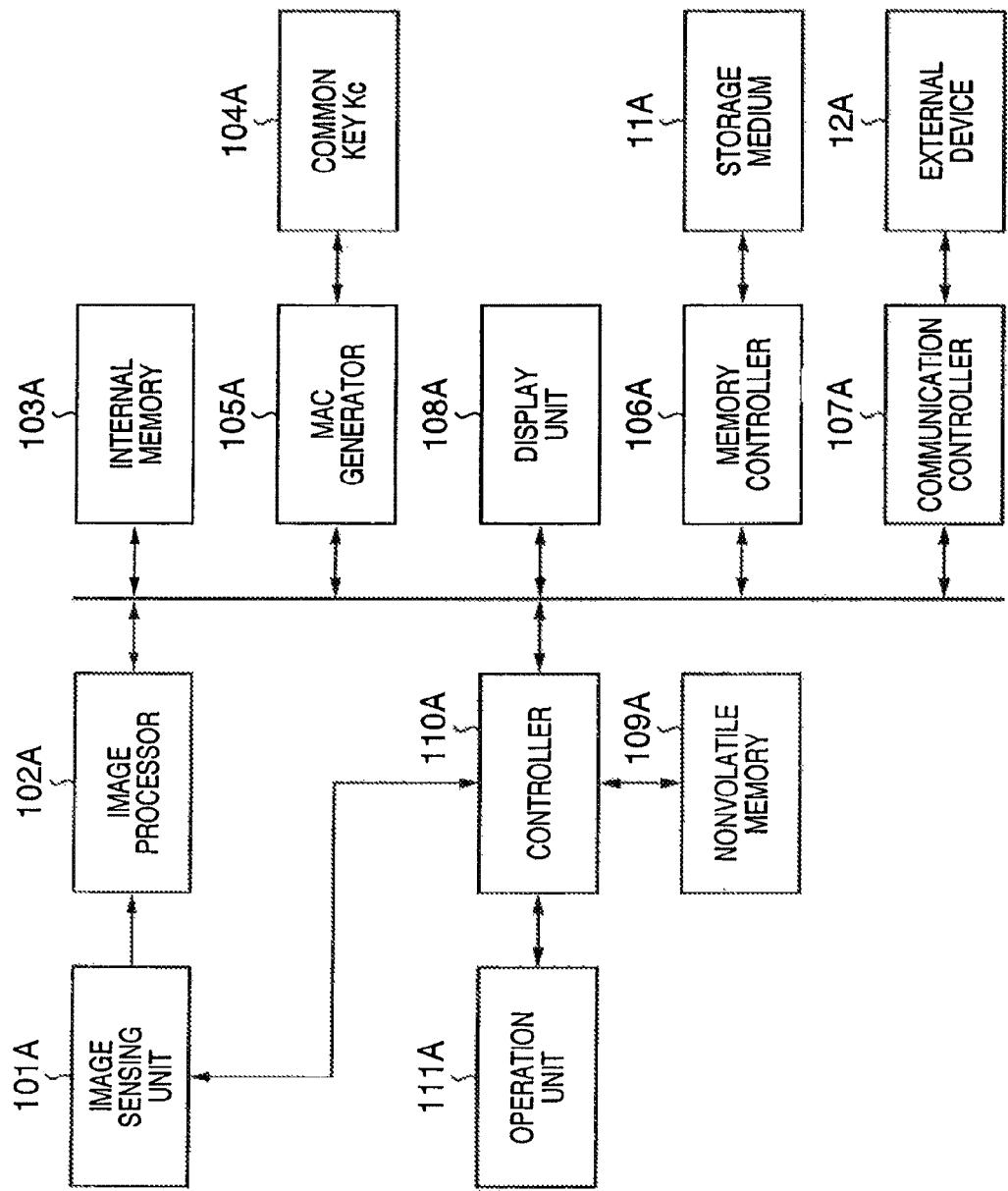
FIG. 2 is a block diagram showing principal constituent elements of an image sensing apparatus 10A.
Figure 3:
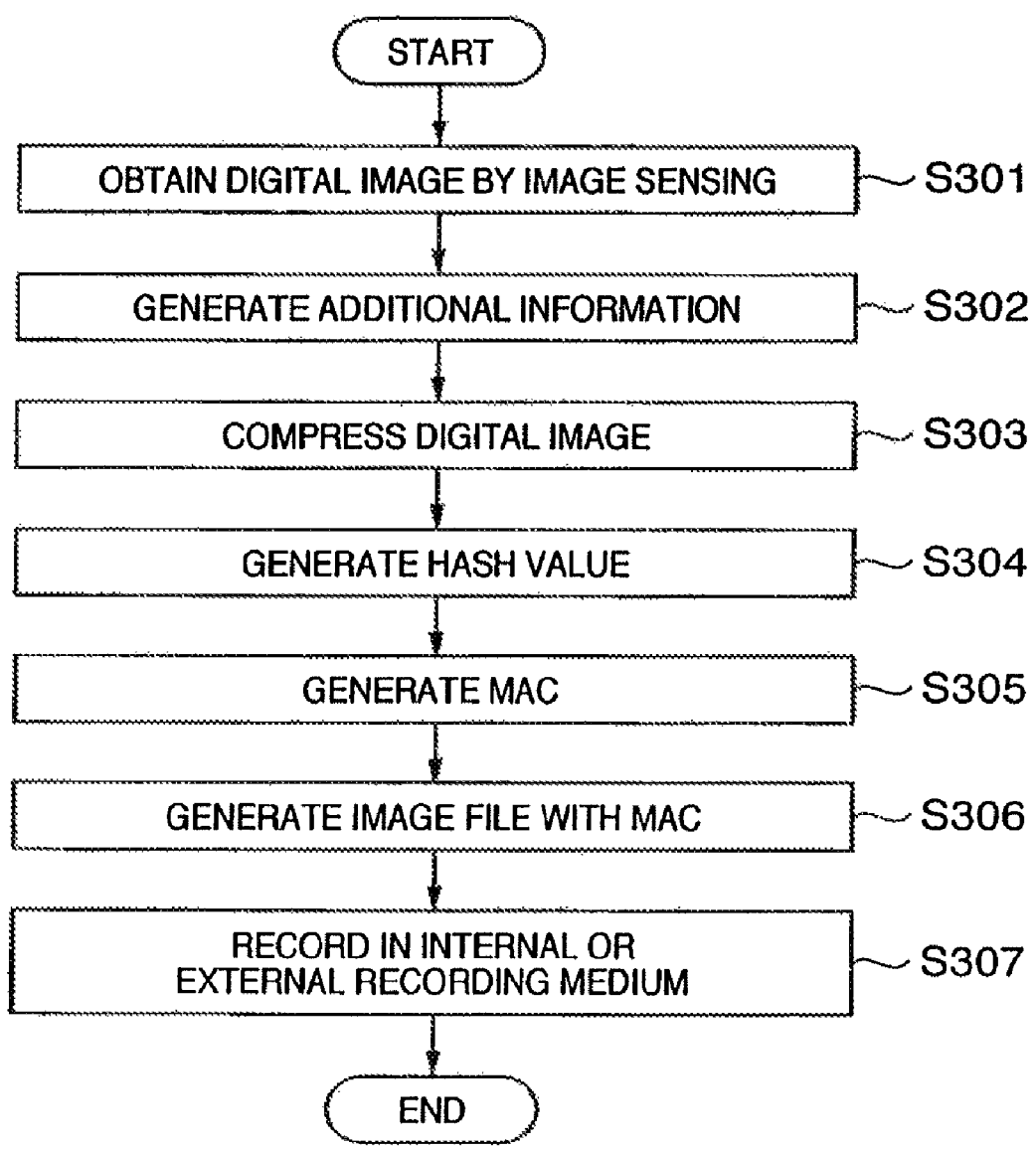
FIG. 3 is a flowchart showing processing of generating an image file with MAC.

Next, processing of generating an image file with MAC will be described with reference to FIGS. 2 and 3. FIG. 2 is a block diagram showing principal constituent elements of the image sensing apparatus 10A. FIG. 3 is a flowchart showing the processing of generating an image file with MAC. The processing in FIG. 3 is realized by controlling the respective functional elements shown in FIG. 2 by a controller 110A in accordance with a program recorded on a nonvolatile memory 109A.

Step S301: The user operates an operation unit 111A to input an image sensing instruction to the controller 110A. An image sensing unit 101A obtains a digital image of a subject in accordance with the instruction from the controller 110A.

Step S302: The controller 110A generates additional information (a thumbnail image, the date of image sensing, the shutter speed, the aperture value, the ISO sensitivity and the like) of the digital image obtained by the image sensing unit 101A, and stores the additional information onto an internal memory 103A.

Step S303: An image processor 102A determines an image recording format selected by the user from the operation unit 111A prior to image sensing.

In a case where the image recording format is JPEG format, the image processor 102A reads image adjustment parameters, a compression ratio and a size (the number of pixels) selected by the user from the operation unit 111A prior to the image sensing, from the nonvolatile memory 109A. The image processor 102A adjusts the digital image obtained by the image sensing unit 101A in accordance with the image adjustment parameters read from the nonvolatile memory 109A, then compresses the adjusted digital image in accordance with the JPEG format, and writes the compressed digital image onto the internal memory 103A.

Further, if the image recording format is RAW format (raw data), the image processor 102A compresses the digital image obtained by the image sensing unit 101A in accordance with a predetermined reversible compression method, without adjustment in accordance with the image adjustment parameters in the nonvolatile memory 109A, and writes the compressed digital image onto the internal memory 103A.

Note that in the first embodiment, information to adjust the contrast, the sharpness (edge enhancement), the color density, the color temperature, the color space, the compression ratio, the size (the number of pixels) and the like of digital image obtained by image sensing are referred to as "image adjustment parameters."

Step S304: A MAC generator 105A generates a hash value (digest data) of the additional information generated at step S302 and the digital image processed at step S303. That is, in the first embodiment, the digital image and its additional information are handled as the subject of authentication. Note that a hash function necessary for generation of hash value is MD5, SHA1, RIPEMD or the like.

Step S305: The MAC generator 105A converts the hash value into MAC by using a common key Kc, and stores the MAC onto the internal memory 103A. MAC is information necessary for authenticating whether or not additional information and digital image have been altered. In other words, the MAC is information necessary for authenticating whether or not the digital image and the additional information are original information.

The common key Kc is information corresponding to a common key in a common-key encryption system (an encryption key and a decryption key belong to the same encryption system; also referred to as a secret key encryption system or a symmetric key encryption system). The common key Kc must be secretly managed in the image sensing apparatus 10A. The common key Kc is stored in a memory 104A.

Figure 4:
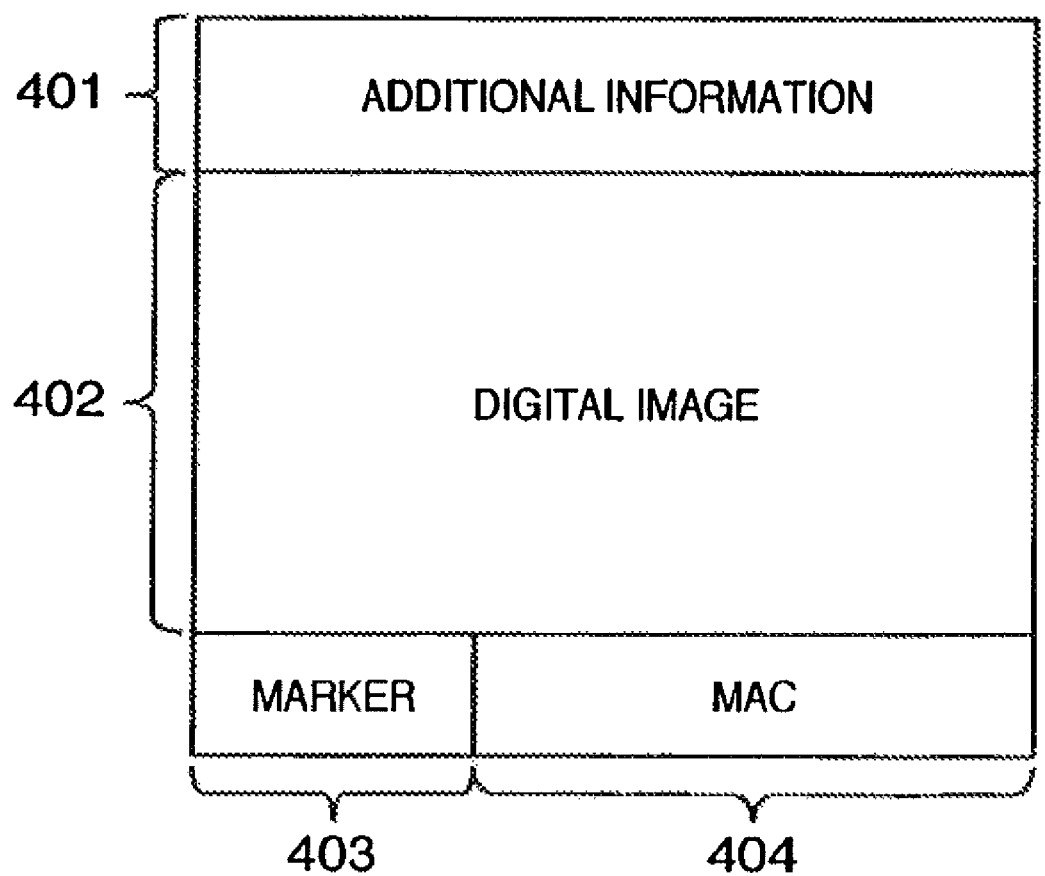
FIG. 4 is a table showing an example of the structure of the image file with MAC.

Step S306: The controller 110A generates an image file with MAC by using the internal memory 103A. FIG. 4 shows an example of image file with MAC.

In FIG. 4, an area 401 is used for storing the additional information generated at step S302. That is, information on the image file (the thumbnail image, the date of image sensing, the shutter speed, the aperture value, the ISO sensitivity and the like) and information on the apparatus which generated the image file (a model name, a product number and the like) are stored in this area. In the present embodiment, a number to specify an apparatus which generated an image file is referred to as a "product number."

An area 402 is used for storing the digital image processed at step S303. That is, the area 402 is used for storing an original image. An area 403 includes a marker indicating the type of authentication data existing in an area 404. In this case, the marker indicates MAC. The area 404 is used for storing the MAC obtained at step S305. Note that the area 404 may be provided between the area 401 and the area 402 or in the area 401.

Step S307: If the destination of recording of the image file, selected by the user from the operation unit 111A prior to image sensing, is a recording medium 11A, a memory controller 106A writes the image file with MAC generated at step S306 onto the recording medium 11A. The recording medium 11A is a removable recording medium such as a memory card. On the other hand, if the destination of recording, selected by the user from the operation unit 111A prior to image sensing, is an external device 12A, a communication controller 107A writes the image file with MAC generated at step S306 onto a recording medium of the external device 12A. Further, a display unit 108A displays a compressed image of the image file with MAC generated at step S306.

Next, alteration processing performed in the image sensing apparatus 10A will be described with reference to the flowchart of FIG. 5. The alteration processing is to alter the contents of a general image file or an image file with MAC in accordance with an instruction from a user. This processing is realized by controlling the respective functional elements by the controller 110A in accordance with a program stored on the nonvolatile memory 109A.

Step S501: The controller 110A reads an image file, selected by the user from the operation unit 111A, from the recording medium 11A, and writes the read image file onto the internal memory 103A. Hereinafter, the image file selected by the user is referred to as a "selected file."

Step S502: The controller 110A determines whether or not the selected file is an image file with MAC.

Step S503: If the selected file is an image file with MAC, the controller 110A displays a message indicating that the selected file after alteration will be recorded in a predetermined folder in the recording medium 11A (a folder which is selected by the user or the image sensing apparatus 10A or newly generated, and which is different from the original folder of the selected file) on the display unit 108A.

Step S504: The controller 110A alters the contents of the selected file in accordance with alteration processing (development processing, re-compression processing, resize processing and the like) selected by the user from the operation unit 111A. Further, the controller 110A adds information on the original of the selected file (file name or the like) to the altered selected file, so as to facilitate discrimination of the relation between the altered file and the original of the selected file.

The development processing is effective when the selected file is a RAW image file (image file recorded in the RAW format). In this processing, a digital image in the selected file is adjusted in accordance with image adjustment parameters selected by the user from the operation unit 111A, and the adjusted digital image is JPEG-compressed. Note that the compression ratio and size (the number of pixels) are selected by the user from the operation unit 111A. Note that after the alteration processing, the controller 110A deletes the MAC from the selected file.

The re-compression processing is effective when the selected file is a JPEG image file (image file recorded in the JPEG format). In this processing, the compression ratio of the digital image in the selected file is changed to that selected by the user from the operation unit 111A. The compression ratio selectable in the re-compression processing is lower than that of the original of the selected file.

The resize processing is effective if the selected file is a JPEG image file (image file recorded in the JPEG format). In this processing, the size (number of pixels) of the digital image in the selected file is changed to a size (number of pixels) selected by the user from the operation unit 111A. The size selectable in the resize processing is smaller than that of the original of the selected file.

Step S505: The controller 110A controls the memory controller 106A to record the selected file after the alteration into the predetermined folder notified to the user at step S503. At this time, the controller 110A avoids deleting the original selected file from the recording medium 11A. Note that in the first embodiment, to facilitate discrimination of the relation between the selected file after alteration and the original of the selected file, a part of the file name of the selected file after the alteration is the same as a part of the file name of the original of the selected file.

Step S506: On the other hand, if the selected file is not an image file with MAC, the controller 110A alters the contents of the selected file in accordance with alteration processing (development processing, re-compression processing, resize processing and the like) selected by the user from the operation unit 111A.

Step S507: The controller 110A asks the user as to whether or not the selected file after the alteration will be overwritten on the selected file in the recording medium 11A.

Step S508: If the user has selected overwriting with the operation unit 111A, the image sensing apparatus 10A saves the selected file after the alteration by overwriting. That is, the image sensing apparatus 10A records the selected file after the alteration in the same folder of the original selected file instead of deleting the original selected file from the recording medium 11A.

Step S509: If the user has not selected overwriting, the image sensing apparatus 10A records the selected file after the alteration in a predetermined folder (a folder which is selected by the user or the image sensing apparatus 10A or newly generated, and which is different from the original folder of the selected file). At this time, the controller 110A avoids deleting the selected file from the recording medium 11A. Note that in the first embodiment, to facilitate discrimination of the relation between the selected file after alteration and the original of the selected file, a part of the file name of the selected file after the alteration is the same as a part of the file name of the original of the selected file.

In this manner, in the image sensing apparatus 10A according to the first embodiment, the contents of an image file with MAC can be altered in accordance with alteration processing selected by the user without alteration of the original of image file with MAC.

Further, in the image sensing apparatus 10A according to the first embodiment, in a case where the image file with MAC has been altered, a part of the file name of the altered image file is the same as a part of the file name of the original of the image file, and the altered image file is recorded in a folder different from that of the original. Thus the relation between the altered image file and its original can be easily discriminated.

Further, in the image sensing apparatus 10A according to the first embodiment, in a case where an image file with MAC has been altered, as information on the original image file (file name or the like) can be added to the altered image file, the relation between the altered image file and its original can be easily discriminated.

Figure 6:
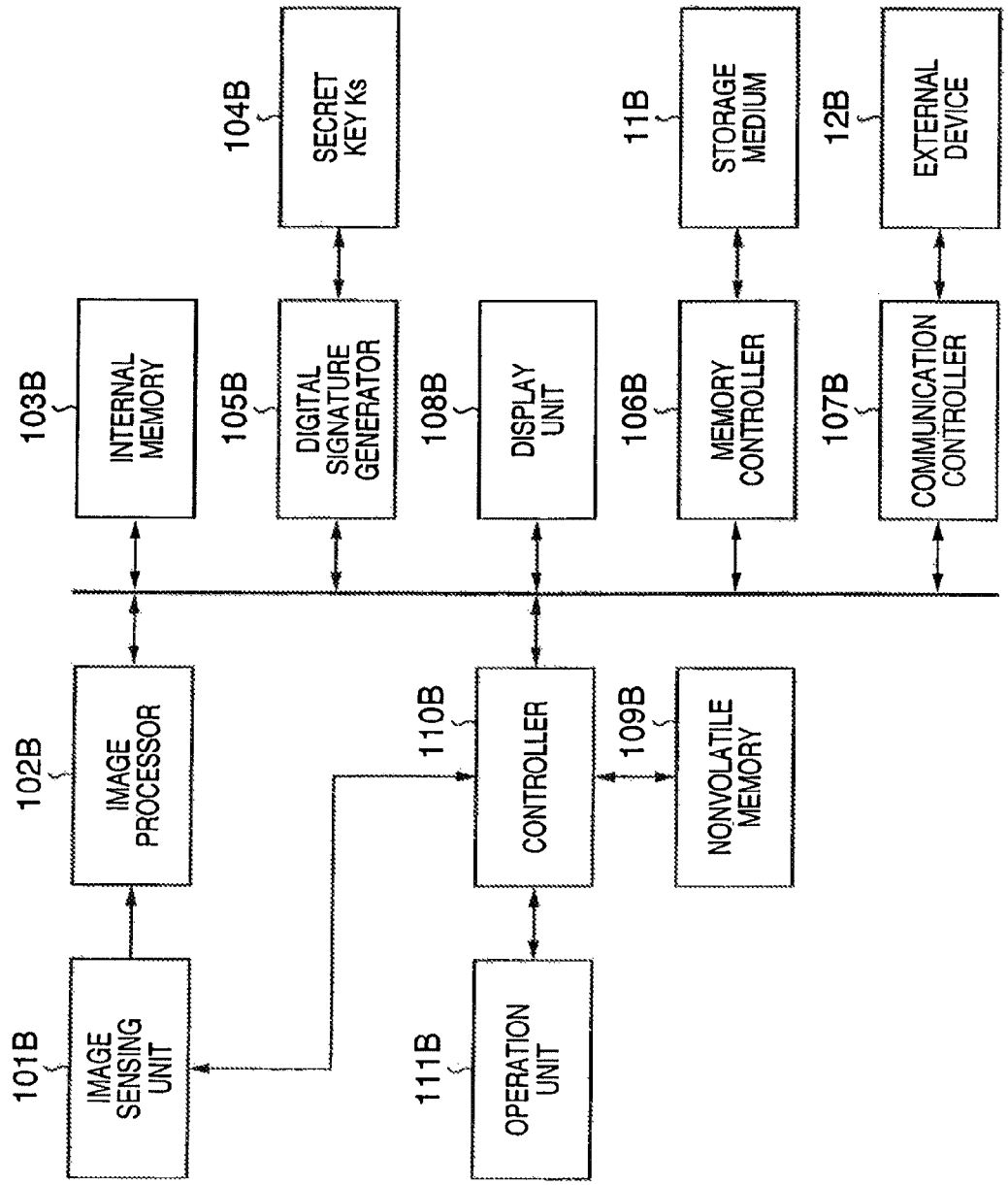
FIG. 6 is a block diagram showing principal constituent elements of an image sensing apparatus 10B.
Figure 7:
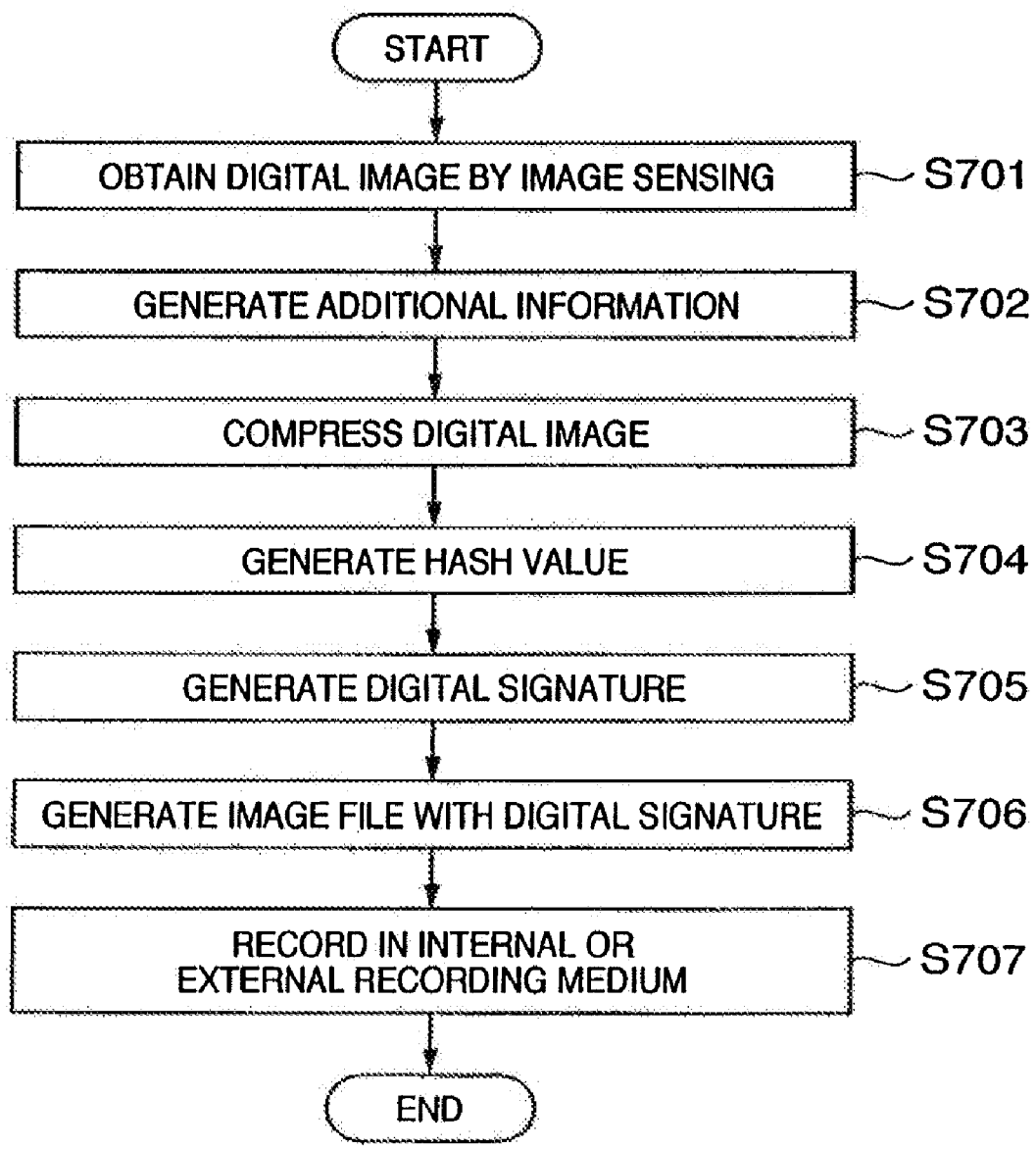
FIG. 7 is a flowchart showing processing of generating image file with digital signature.

Next, processing of generating an image file with digital signature will be described with reference to FIGS. 6 and 7. FIG. 6 is a block diagram showing principal constituent elements of the image sensing apparatus 10B. FIG. 7 is a flowchart showing the processing of generating image file with digital signature. The processing shown in FIG. 7 is realized by controlling the respective functional elements shown in FIG. 6 by a controller 110B in accordance with a program recorded on a nonvolatile memory 109B.

Step S701: The user operates an operation unit 111B to input an image sensing instruction to the controller 110B. An image sensing unit 101B obtains a digital image of a subject in accordance with the instruction from the controller 110B.

Step S702: The controller 110B generates additional information (a thumbnail image, the date of image sensing, the shutter speed, the aperture value, the ISO sensitivity and the like) of the digital image obtained by the image sensing unit 101B, and stores the additional information onto an internal memory 103B.

Step S703: An image processor 102B determines an image recording format selected by the user from the operation unit 111B prior to image sensing.

In a case where the image recording format is JPEG format, the image processor 102B reads image adjustment parameters a compression ratio and a size (the number of pixels), selected by the user from the operation unit 111B prior to the image sensing, from the nonvolatile memory 109B. The image processor 102B adjusts the digital image obtained by the image sensing unit 101B in accordance with the image adjustment parameters read from the nonvolatile memory 109B, then compresses the adjusted digital image in accordance with the JPEG format, and writes the compressed digital image onto the internal memory 103B.

Further, if the image recording format is RAW format, the image processor 102B compresses the digital image obtained by the image sensing unit 101B in accordance with a predetermined reversible compression method, without adjustment in accordance with the image adjustment parameters in the nonvolatile memory 109B, and writes the compressed digital image onto the internal memory 103B.

Step S704: A digital signature generator 105B generates a hash value (digest data) of the additional information generated at step S702 and the digital image processed at step S703. That is, in the first embodiment, the digital image and its additional information are handled as the subject of authentication. Note that a hash function necessary for generation of hash value is MD5, SHA1, RIPEMD or the like.

Step S705: The digital signature generator 105B converts the hash value into a digital signature by using a secret key Ks, and stores the digital signature onto the internal memory 103B. A digital signature is information necessary for authenticating whether or not additional information and digital image have been altered. In other words, the digital signature is information necessary for authenticating whether or not the digital image and the additional information are original information.

In the present embodiment, the secret key Ks is used for generation of digital signature. The secret key Ks is information corresponding to a secret key in a common-key encryption system (an encryption key and a decryption key belong to the same encryption system; also referred to as a secret key encryption system or a symmetric key encryption system). The secret key Ks must be secretly managed in the image sensing apparatus 10B. The secret key Ks is stored in a memory 104B.

Figure 8:
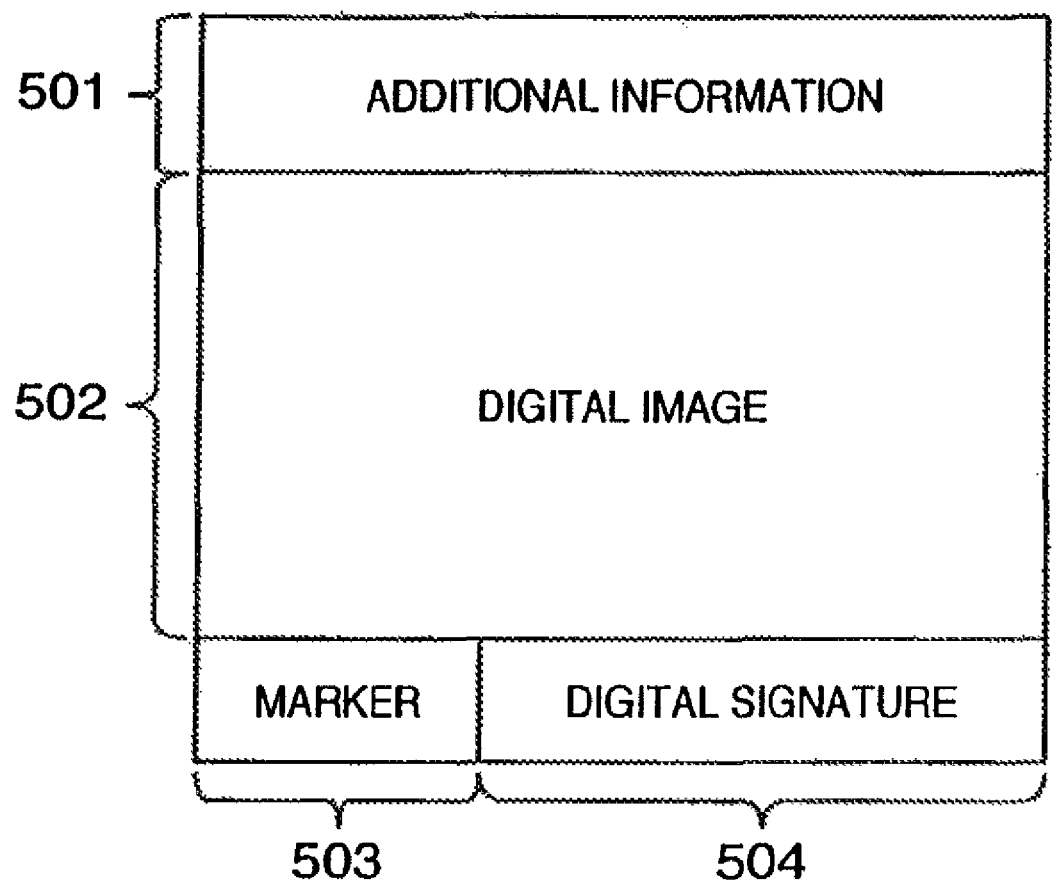
FIG. 8 is a table showing an example of the structure of the image file with digital signature.

Step S706: The controller 110B generates an image file with digital signature by using the internal memory 103B. FIG. 8 shows an example of image file with digital signature.

In FIG. 8, an area 501 is used for storing the additional information generated at step S702. That is, information on the image file (the thumbnail image, the date of image sensing, the shutter speed, the aperture value, the ISO sensitivity and the like) and information on the apparatus which generated the image file (a model name, a product number and the like) are stored in this area.

An area 502 is used for storing the digital image compressed at step S703. That is, the area 502 is used for storing an original image. An area 503 includes a marker indicating the type of authentication data existing in an area 504. In this case, the marker indicates the digital signature. The area 504 is used for storing the digital signature obtained at step S705. Note that the area 504 may be provided between the area 501 and the area 502 or in the area 501.

Step S707: If the recording destination of the image file, selected by the user from the operation unit 111B prior to image sensing, is a recording medium 11B, a memory controller 106B writes the image file with digital signature generated at step S706 onto the recording medium 11B. The recording medium 11B is a removable recording medium such as a memory card. On the other hand, if the recording destination, selected by the user from the operation unit 111A prior to image sensing, is an external device 12B, a communication controller 107B writes the image file with digital signature generated at step S706 onto a recording medium of the external device 12B. Further, a display unit 108B displays a compressed image of the image file with MAC generated at step S706.

Next, alteration processing performed in the image sensing apparatus 10B will be described with reference to the flowchart of FIG. 9. The alteration processing is to alter the contents of a general image file or an image file with digital signature in accordance with an instruction from a user. This processing is realized by controlling the respective functional elements by the controller 110B in accordance with a program stored on the nonvolatile memory 109B.

Step S901: The controller 110B reads an image file, selected by the user from the operation unit 111B, from the recording medium 11B, and writes the read image file onto the internal memory 103B. Hereinafter, the image file selected by the user is referred to as a "selected file."

Step S902: The controller 110B determines whether or not the selected file is an image file with digital signature.

Step S903: If the selected file is an image file with digital signature, the controller 110B displays a message indicating that the selected file after alteration will be recorded in a predetermined folder in the recording medium 11B (a folder which is selected by the user or the image sensing apparatus 10B or newly generated, and which is different from the original folder of the selected file) on the display unit 108B.

Step S904: The controller 110B alters the contents of the selected file in accordance with alteration processing (development processing, re-compression processing, resize processing and the like) selected by the user from the operation unit 111B. Further, the controller 110B adds information on the original of the selected file (file name or the like) to the altered selected file, so as to facilitate discrimination of the relation between the altered file and the original of the selected file. Note that after the alteration, the controller 110B deletes the digital signature from the selected file.

The development processing is effective when the selected file is a RAW image file (image file recorded in the RAW format). In this processing, a digital image in the selected file is adjusted in accordance with image adjustment parameters selected by the user from the operation unit 111B, and the adjusted digital image is JPEG-compressed. Note that the compression ratio and size (the number of pixels) are selected by the user from the operation unit 111B.

The re-compression processing is effective when the selected file is a JPEG image file (image file recorded in the JPEG format). In this processing, the compression ratio of the digital image in the selected file is changed to that selected by the user from the operation unit 111B. The compression ratio selectable in the re-compression processing is lower than that of the original of the selected file.

The resize processing is effective when the selected file is a JPEG image file (image file recorded in the JPEG format). In this processing, the size (number of pixels) of the digital image in the selected file is changed to a size (number of pixels) selected by the user from the operation unit 111B. The size selectable in the resize processing is smaller than that of the original of the selected file.

Step S905: The controller 110B controls the memory controller 106B to record the selected file after the alteration into the predetermined folder notified to the user at step S903. At this time, the controller 110B avoids deleting the original of the selected file from the recording medium 11B. Note that in the first embodiment, to facilitate discrimination of the relation between the selected file after alteration and the original of the selected file, a part of the file name of the selected file after the alteration is the same as a part of the file name of the original of the selected file.

Step S906: On the other hand, if the selected file is not an image file with digital signature, the controller 110B alters the contents of the selected file in accordance with alteration processing (development processing, re-compression processing, resize processing and the like) selected by the user from the operation unit 111B.

Step S907: The controller 110B asks the user as to whether or not the selected file after the alteration will be overwritten on the selected file in the recording medium 11B.

Step S908: If the user has selected overwriting with the operation unit 111B, the image sensing apparatus 10B saves the selected file after the alteration by overwriting. That is, the image sensing apparatus 10B records the selected file after the alteration in the same folder of the original of the selected file instead of deleting the original of the selected file from the recording medium 11B.

Step S909: If the user has not selected overwriting, the image sensing apparatus 10B records the selected file after the alteration in a predetermined folder (a folder which is selected by the user or the image sensing apparatus 10B or newly generated, and which is different from the original folder of the selected file). At this time, the controller 110B avoids deleting the selected file from the recording medium 11B. Note that in the first embodiment, to facilitate discrimination of the relation between the selected file after alteration and the original of the selected file, a part of the file name of the selected file after the alteration is the same as a part of the file name of the original of the selected file.

In this manner, in the image sensing apparatus 10B according to the first embodiment, the contents of an image file with digital signature can be altered in accordance with alteration processing selected by the user without alteration of the original of image file with digital signature.

Further, in the image sensing apparatus 10B according to the first embodiment, in a case where the image file with digital signature has been altered, a part of the file name of the altered image file is the same as a part of the file name of the original of the image file, and the altered image file is recorded in a folder different from that of the original. Thus the relation between the altered image file and its original can be easily discriminated.

Further, in the image sensing apparatus 10B according to the first embodiment, in a case where an image file with digital signature has been altered, as information on the original image file (file name or the like) can be added to the altered image file, the relation between the altered image file and its original can be easily discriminated.

Figure 10:
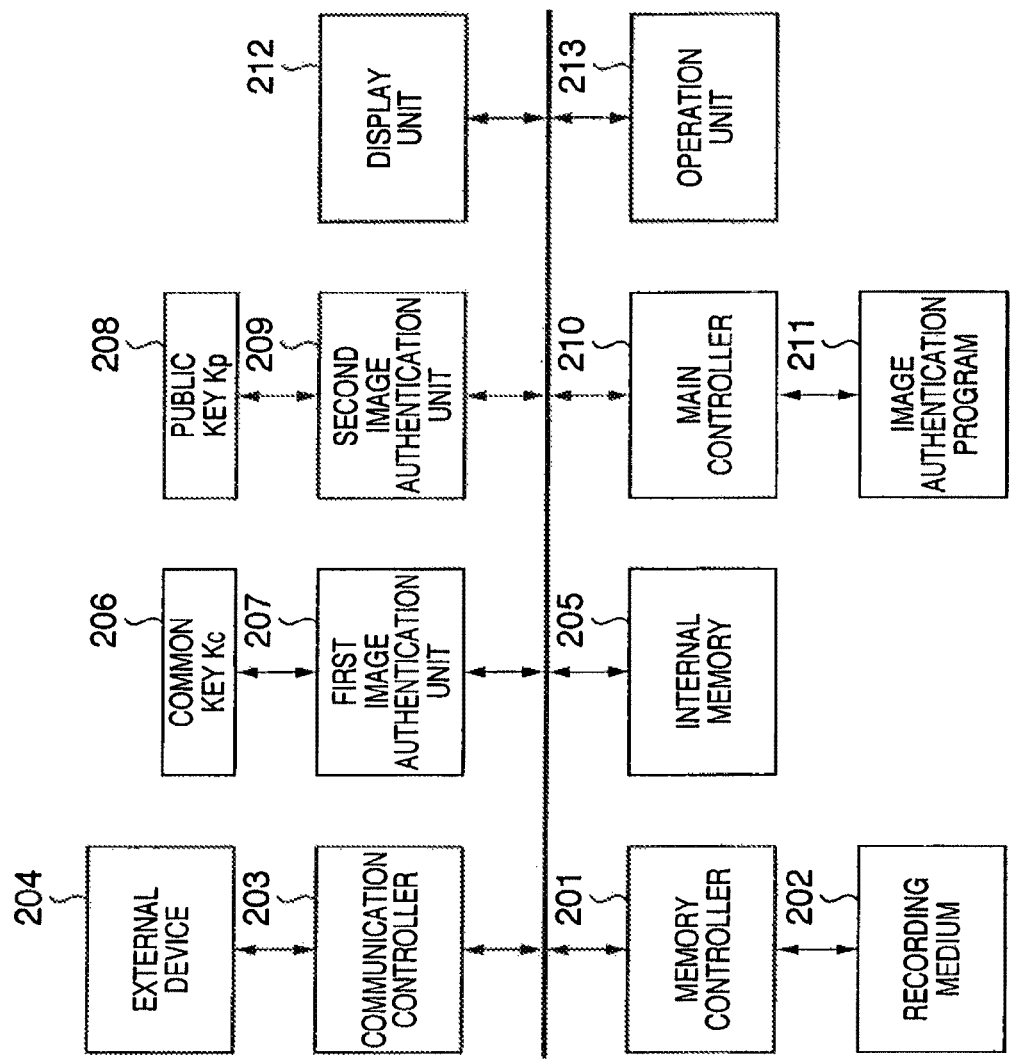
FIG. 10 is a block diagram showing principal constituent elements of an image authentication apparatus 20.

Next, principal constituent elements of the image authentication apparatus 20 will be described with reference to FIG. 10.

A memory controller 201 reads an image file with MAC or an image file with digital signature, selected by the user, from a removable recording medium 202, and stores the read image file onto an internal memory 205. The removable recording medium 202 may be connectable to the image sensing apparatus 10A or the image sensing apparatus 10B.

A communication controller 203 reads an image file with MAC or the image file with digital signature, selected by the user, from a recording medium of an external device 204 via a network, and stores the read image file onto an internal memory 205. Note that the external device 204 may be the image sensing apparatus 10A or the image sensing apparatus 10B.

A memory 206 holds a common key Kc necessary for authentication of alteration of image file with MAC. The common key Kc is the same as the common key Kc in the image sensing apparatus 10A, and is information which must be secretly managed in the image authentication apparatus 20. A first image authentication unit 207 authenticates by using the common key Kc in the memory 206 whether or not an image file with MAC in the internal memory 205 has been altered.

A memory 208 holds a public key Kp necessary for authentication of alteration of image file with digital signature. The public key Kp corresponds to the secret key Ks. That is, the public key Kp is information corresponding to a public key in a public key encryption system and is information which is not necessarily managed in a secret manner. A second image authentication unit 209 authenticates by using the public key Kp in the memory 208 whether or not an image file with digital signature in the internal memory 205 has been altered.

A main controller 210 has a microcomputer to perform an image authentication program recorded on a program memory 211.

Figure 12:
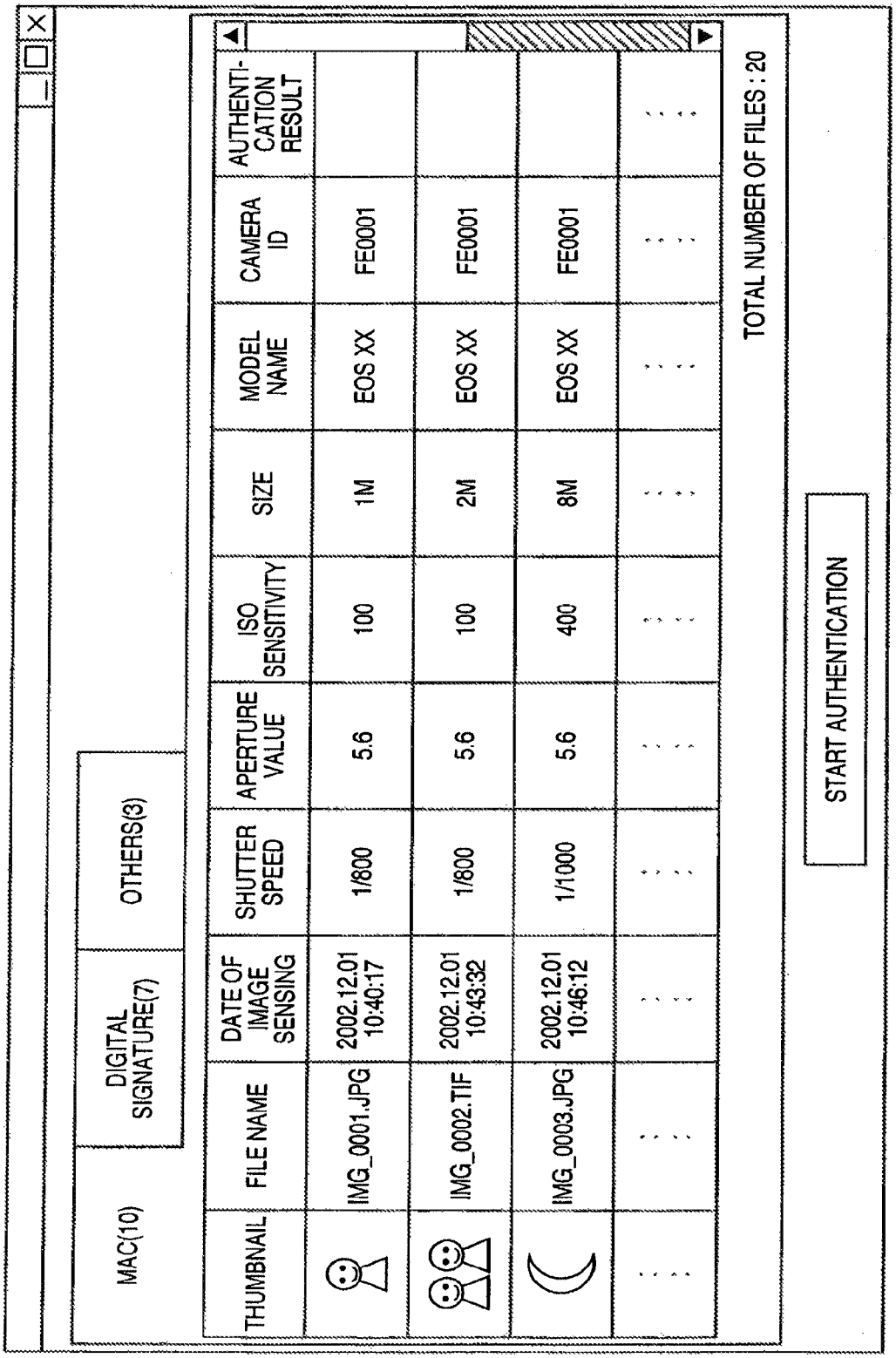
FIG. 12 is an example of a screen display image showing a "MAC" group list (before authentication)

A display unit 212 displays a list screen image generated by the main controller 210 in accordance with the image authentication program. FIGS. 12 and 13 show examples of the list screen image. The image shown in FIG. 12 is a list screen image for a "MAC" group, where the additional information (the thumbnail image, the date of image sensing, the shutter speed, the aperture value, the ISO sensitivity, the model name, the product number and the like) of all the image files with MAC belonging to the "MAC" group, and file names, sizes and results of authentication are listed. Further, the image shown in FIG. 13 is a list screen image for a "digital signature" group, where the additional information (the thumbnail image, the date of image sensing, the shutter speed, the aperture value, the ISO sensitivity, the model name, the product number and the like) of all the image files with digital signature belonging to the "digital signature" group, and file names, sizes and results of authentication are listed.

An operation unit 213 receives the user's instruction and supplies the received instruction to the main controller 210. The user operates the operation unit 213 thereby registers an image file with MAC or an image file with digital signature in the image authentication program. Further, the user operates the operation unit 213 thereby selects an image file with MAC or an image file with digital signature to be authenticated by the image authentication program.

Figure 11:
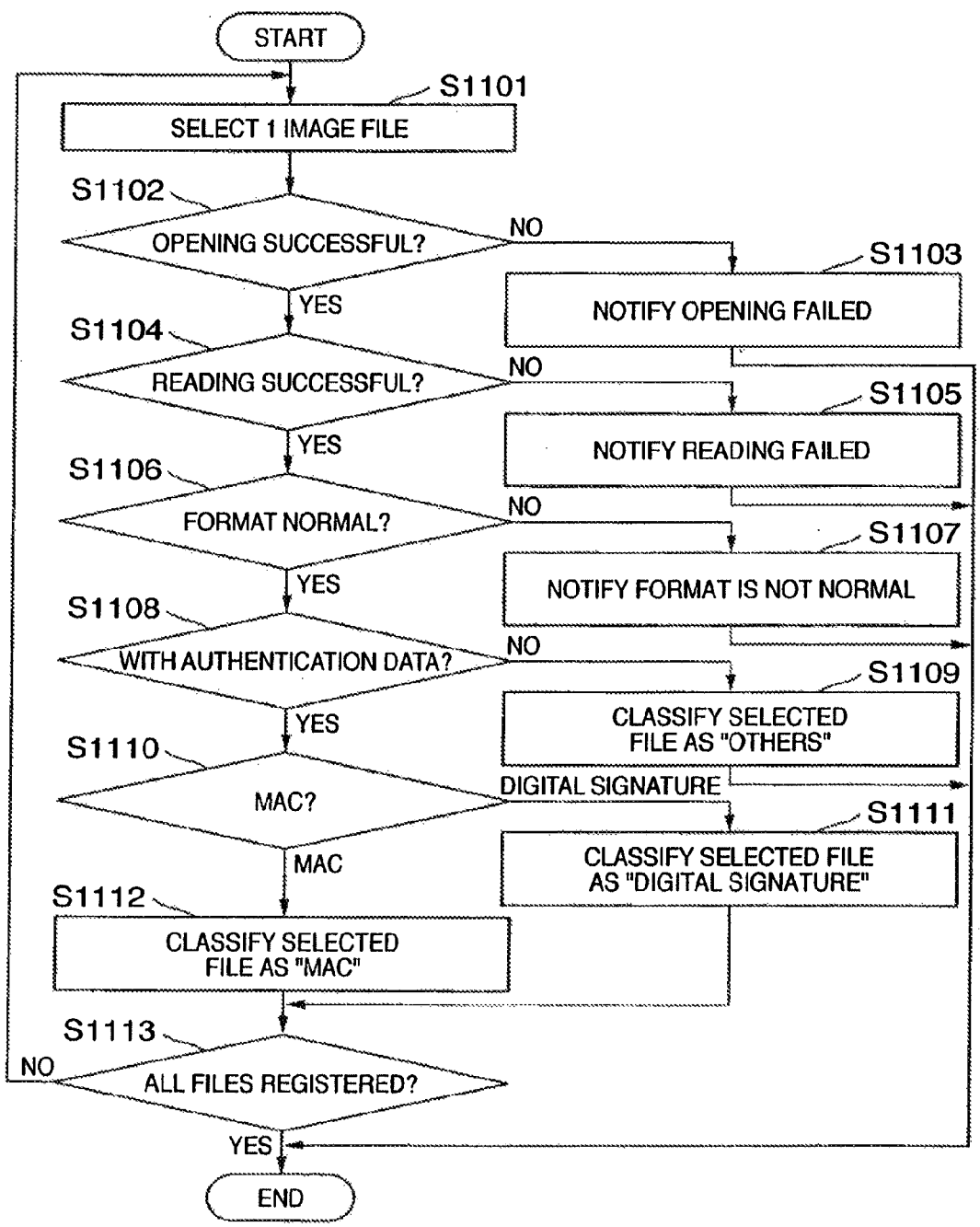
FIG. 11 is a flowchart showing image registration processing.

Next, image registration processing of registering one or more image files selected by the user in the image authentication program will be described with reference to the flowchart of FIG. 11. The image registration processing is controlled by the main controller 210 in accordance with the image authentication program recorded on the program memory 211.

Step S1101: The main controller 210 selects one image file from one or more image files selected by the user, in accordance with a predetermined order. Hereinbelow, the image file with MAC selected by the main controller 210 will be referred to as a "selected file." Note that in a case where the user has selected a folder, the main controller 210 performs processing on the assumption that all the image files in the folder have been selected.

Step S1102: The main controller 210 performs opening of the selected file, and determines whether or not the opening of the selected file has been successful.

Step S1103: The main controller 210 displays a message or a sign indicating that the opening of the selected file has failed on the display unit 212.

Step S1104: The main controller 210 performs reading of the selected file so as to read the selected file from the removable recording medium 202 or the recording medium of the external device 204 onto the internal memory 205. If the reading of the selected file has failed, the main controller 210 proceeds to step S1105. If the reading of the selected file has been successful, the main controller 210 proceeds to step S1106.

Step S1105: The main controller 210 displays a message or a sign indicating that the reading of the selected file has failed on the display unit 212.

Step S1106: The main controller 210 checks the file format of the selected file in the internal memory 205 and determines whether or not the file format is normal.

Step S1107: If the file format of the selected file is not normal, the main controller 210 discards the selected file in the internal memory 205, and displays a message or a sign indicating that the file format of the selected file is not normal on the display unit 212.

Step S1108: If the file format of the selected file is normal, the main controller 210 determines whether or not authentication data (MAC or digital signature in the present embodiment) is attached to the selected file.

Step S1109: If authentication data is not added to the selected file, the main controller 210 classifies the selected file into an "others" group. The "others" group includes image files without MAC or digital signature. Further, the main controller 210 registers the additional information (the thumbnail image, the date of image sensing, the shutter speed, the aperture value, the ISO sensitivity, the model name, the product number and the like), the file name and the size of the selected file in an "others" table in the internal memory 205. The "others" table manages image files classified into the "others" group. Further, the main controller 210 displays the thumbnail image, the file name, the date of image sensing, the shutter speed, the aperture value, the ISO sensitivity, the size, the model name and the product number of the selected file, in a list screen image for the "others" group. Note that if the thumbnail image cannot been obtained from the selected file, the main controller 210 displays a message or a sign indicating that no thumbnail exists in a cell to display a thumbnail image. Further, the main controller 210 displays the total number of image files belonging to the "others" group in the list screen image.

Step S1110: The main controller 210 detects the type of authentication data attached to the selected file.

Step S1111: If the authentication data of the selected file is a digital signature, the main controller 210 classifies the selected file into a "digital signature" group. The "digital signature" group includes image files with digital signature. The main controller 210 registers the additional information (the thumbnail image, the date of image sensing, the shutter speed, the aperture value, the ISO sensitivity, the model name, the product number and the like), the file name and the size of the selected file in a "digital signature" table in the internal memory 205. The "digital signature" table manages image files classified into the "digital signature" group.

Further, as shown in FIG. 13, the main controller 210 displays the thumbnail image, the file name, the date of image sensing, the shutter speed, the aperture value, the ISO sensitivity, the size, the model name and the product number of the selected file, in a list screen image for the "digital signature" group. Note that if there is no thumbnail image in the selected file, the main controller 210 displays a message or a sign indicating that no thumbnail exists in a cell to display a thumbnail image. Further, as shown in FIG. 13, the main controller 210 displays the total number of image files belonging to the "digital signature" group (7 in the present embodiment) and the total number of image files belonging to all the groups (20 in the present embodiment) in the list screen image.

Step S1112: If the authentication data of the selected file is MAC, the main controller 210 classifies the selected file into a "MAC" group. The "MAC" group includes image files with MAC. The main controller 210 registers the additional information (the thumbnail image, the date of image sensing, the shutter speed, the aperture value, the ISO sensitivity, the model name, the product number and the like), the file name and the size of the selected file in a "MAC" table in the internal memory 205. The "MAC" table manages image files classified into the "digital signature" group.

Further, as shown in FIG. 12, the main controller 210 displays the thumbnail image, the file name, the date of image sensing, the shutter speed, the aperture value, the ISO sensitivity, the size, the model name and the product number of the selected file, in a list screen image for the "MAC" group. Note that if there is no thumbnail image in the selected file, the main controller 210 displays a message or a sign indicating that no thumbnail exists in a cell to display a thumbnail image. Further, as shown in FIG. 12, the main controller 210 displays the total number of image files belonging to the "MAC" group (10 in the present embodiment) and the total number of image files belonging to all the groups (20 in the present embodiment) in the list screen image.

Step S1113: The main controller 210 determines whether or not all the image files selected by the user have been registered in the image authentication program. If all the image files have not been registered, the main controller 210 returns to step S1101.

By the above procedure, the image authentication apparatus 20 of the present embodiment registers one or more image files selected by the user in the image authentication program.

Figure 14:
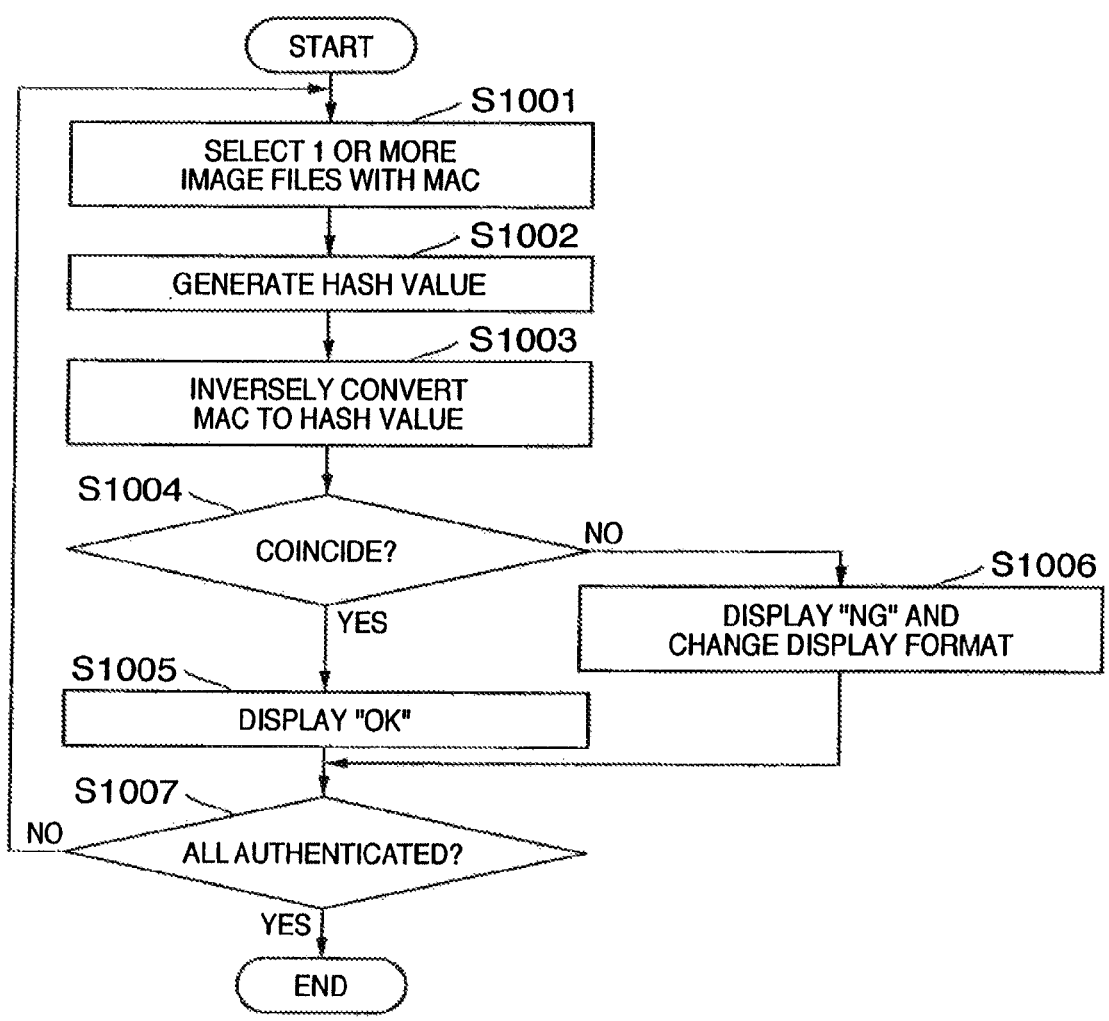
FIG. 14 is a flowchart showing first image authentication processing.

Next, first image authentication processing of authenticating whether or not an image file with MAC has been altered will be described with reference to the flowchart of FIG. 14. The first image authentication processing is controlled by the main controller 210 in accordance with the image authentication program recorded on the program memory 211.

Step S1001: The user selects one or more image files with MAC to be authenticated by the image authentication program from the "MAC" group, and depresses an "start authentication" button as shown in FIG. 12. The main controller 210 detects the depression of the "start authentication" button, and selects one image file with MAC from the one or more images with MAC selected by the user, in accordance with a predetermined order. Hereinbelow, the image file with MAC selected by the main controller 210 will be referred to as a "selected file."

Step S1002: The main controller 210 reads the selected file from the removable recording medium 202 or the recording medium of the external device 204 onto the internal memory 205, and requests the first image authentication unit 207 to authenticate the selected file. The first image authentication unit 207 extracts the additional information and the digital image from the areas 401 and 402 of the selected file and generates a hash value thereof.

Step S1003: The first image authentication unit 207 extracts the MAC from the area 404 of the selected file, and reads the common key Kc from the memory 206. Then the first image authentication unit 207 inverse-converts (decode) the MAC to a hash value by using the common key Kc.

Step S1004: To authenticate whether or not the selected file has been altered, the first image authentication unit 207 compares the hash value obtained at step S1002 with the hash value obtained at step S1003 and determines whether or not the two hash values coincide with each other.

If the areas 401, 402 and 404 of the selected file have not altered, the two hash values coincide. In this case, the first image authentication unit 207 determines as "not altered." In other words, the first image authentication unit 207 determines that the selected file is the original.

If at least one of the areas 401, 302 and 404 of the selected file has been altered, the two has values does not coincide. In this case, the first image authentication unit 207 determines as "altered." In other words, the first image authentication unit 207 determines that the selected file is not the original. The result of determination by the first image authentication unit 207 is notified to the main controller 210.

Step S1005: If the two hash values have coincided, the main controller 210 displays "OK" in a cell of the result of authentication as shown in FIG. 16. "OK" is information indicating that the selected file is an image file determined as "not altered."

Step S1006: If the two hash values have not coincided, the main controller 210 displays "NG" in the cell of the result of authentication as shown in FIG. 16. "NG" is information indicating that the selected file is an image file determined as "altered." In a case where the selected file is an image file determined as "altered," there is a possibility that the additional information in the area 401 has been altered.

The main controller 210 changes the display format of the additional information to first, second or third display format so as to notify the user of the possibility that the additional information (the thumbnail image, the date of image sensing, the shutter speed, the aperture value, the ISO sensitivity, the size, the model name, the product number and the like) obtained from the area 401 of the selected file has been altered.

In the first display format, all the information displayed in the cells of thumb nail, date of image sensing, shutter speed, aperture value, ISO sensitivity, size, model name and product number are deleted. In the second display format, as shown in FIG. 16, a sign (for example, "x") indicating the possibility that the thumbnail image has been altered is added to the cell of thumbnail, and all the information displayed in the cells of date of image sensing, shutter speed, aperture value, ISO sensitivity, size, model name and product number are deleted. In the third display format, a sign (for example, "x") indicating possibility of alteration is added to the cells of thumbnail, date of image sensing, shutter speed, aperture value, ISO sensitivity, size, model name and product number. Note that any other display format may be displayed as long as the possibility that the additional information of selected file has been altered can be notified to the user.

Step S1007: The main controller 210 determines whether or not all the image files with MAC selected by the user have been authenticated. If all the image files have not been authenticated, the main controller 210 returns to step S1001.

By the above processing procedure, the image authentication apparatus 20 authenticates whether or not the image file with MAC selected by the user has been altered.

Figure 15:
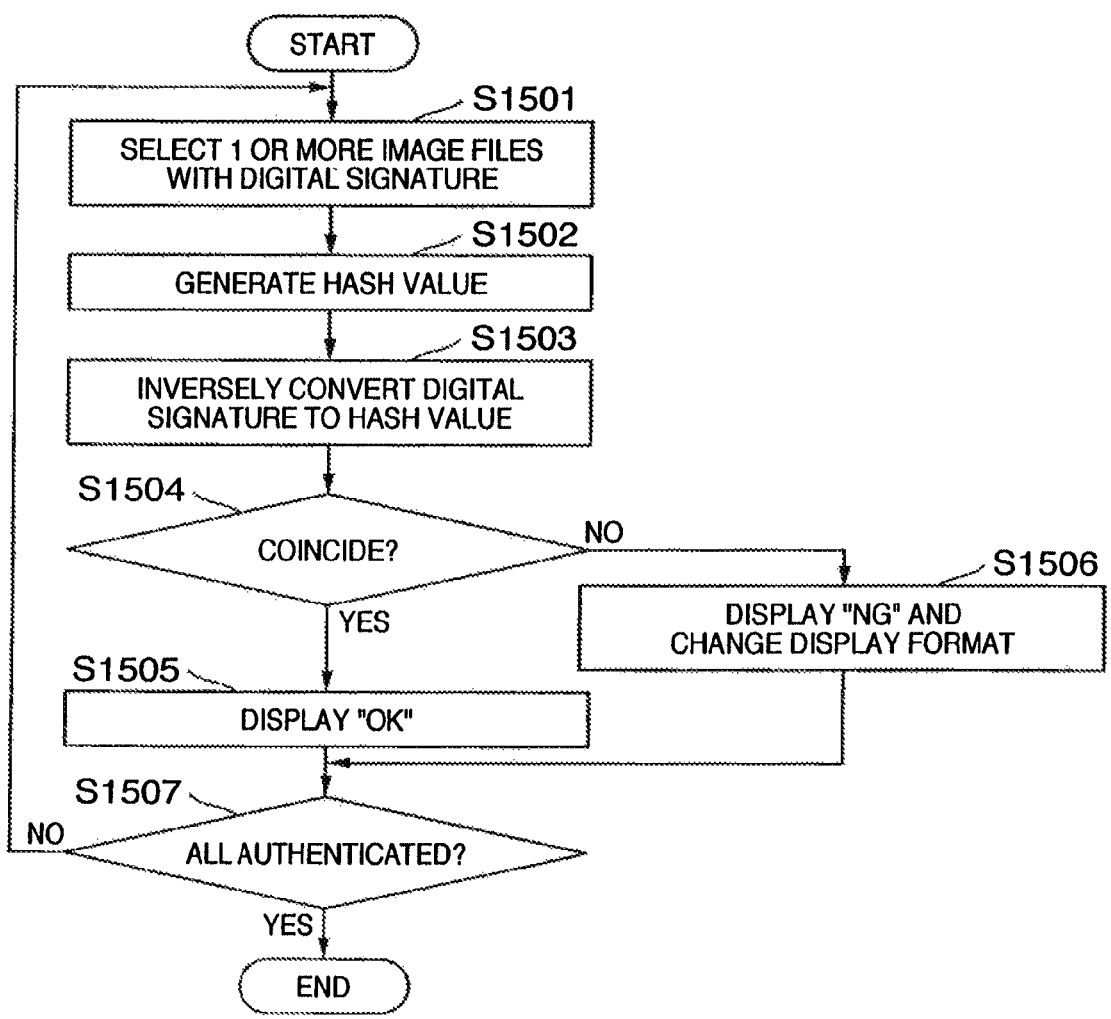
FIG. 15 is a flowchart showing second image authentication processing.

Next, second image authentication processing of authenticating whether or not an image file with digital signature has been altered will be described with reference to the flowchart of FIG. 15. The second image authentication processing is controlled by the main controller 210 in accordance with the image authentication program recorded on the program memory 211.

Step S1501: The user selects one or more image files with digital signature to be authenticated by the image authentication program from the "digital signature" group, and depresses an "start authentication" button as shown in FIG. 13. The main controller 210 detects the depression of the "start authentication" button, and selects one image file with MAC from the one or more images with digital signature selected by the user, in accordance with a predetermined order. Hereinbelow, the image file with digital signature selected by the main controller 210 will be referred to as a "selected file."

Step S1502: The main controller 210 reads the selected file from the removable recording medium 202 or the recording medium of the external device 204 onto the internal memory 205, and requests the second image authentication unit 209 to authenticate the selected file. The second image authentication unit 209 extracts the additional information and the digital image from the areas 501 and 502 of the selected file and generates a hash value thereof.

Step S1503: The second image authentication unit 209 extracts the digital signature from the area 504 of the selected file, and reads the public key Kp from the memory 208. Then the second image authentication unit 209 inverse-converts (decode) the digital signature to a hash value by using the public key Kp.

Step S1504: To authenticate whether or not the selected file has been altered, the second image authentication unit 209 compares the hash value obtained at step S1502 with the hash value obtained at step S1503 and determines whether or not the two hash values coincide with each other.

If the areas 501, 502 and 504 of the selected file have not altered, the two hash values coincide. In this case, the second image authentication unit 209 determines as "not altered." In other words, the second image authentication unit 209 determines that the selected file is the original.

If at least one of the areas 501, 502 and 504 of the selected file has been altered, the two has values does not coincide. In this case, the second image authentication unit 209 determines as "altered." In other words, the second image authentication unit 297 determines that the selected file is not the original. The result of determination by the second image authentication unit 209 is notified to the main controller 210.

Step S1505: If the two has values have coincided, the main controller 210 displays "OK" in a cell of the result of authentication as shown in FIG. 17. "OK" is information indicating that the selected file is an image file determined as "not altered."

Step S1506: If the two hash values have not coincided, the main controller 210 displays "NG" in the cell of the result of authentication as shown in FIG. 17. "NG" is information indicating that the selected file is an image file determined as "altered." In a case where the selected file is an image file determined as "altered," there is a possibility that the additional information in the area 501 has been altered.

The main controller 210 changes the display format of the additional information to first, second or third display format so as to notify the user of the possibility that the additional information (the thumbnail image, the date of image sensing, the shutter speed, the aperture value, the ISO sensitivity, the size, the model name, the product number and the like) obtained from the area 501 of the selected file has been altered.

In the first display format, all the information displayed in the cells of thumb nail, date of image sensing, shutter speed, aperture value, ISO sensitivity, size, model name and product number are deleted. In the second display format, as shown in FIG. 17, a sign (for example, "x") indicating the possibility that the thumbnail image has been altered is added to the cell of thumbnail, and all the information displayed in the cells of date of image sensing, shutter speed, aperture value, ISO sensitivity, size, model name and product number are deleted. In the third display format, a sign (for example, "x") indicating possibility of alteration is added to the cells of thumbnail, date of image sensing, shutter speed, aperture value, ISO sensitivity, size, model name and product number. Note that any other display format may be displayed as long as the possibility that the additional information of selected file has been altered can be notified to the user.

Step S1507: The main controller 210 determines whether or not all the image files with digital signature selected by the user have been authenticated. If all the image files have not been authenticated, the main controller 210 returns to step S1501.

By the above processing procedure, the image authentication apparatus 20 authenticates whether or not the image file with digital signature selected by the user has been altered.

In this manner, according to the image authentication apparatus 20 of the first embodiment, as the display format of the additional information (thumbnail image, date of image sensing, shutter speed, aperture value, ISO sensitivity, size, model name, product number and the like) of an image file with MAC determined as "altered" can be changed, additional information with possibility of alteration can be clearly notified to the user.

Further, according to the image authentication apparatus 20 of the first embodiment, as the display format of the additional information (thumbnail image, date of image sensing, shutter speed, aperture value, ISO sensitivity, size, model name, product number and the like) of an image file with digital signature determined as "altered" can be changed, additional information with possibility of alteration can be clearly notified to the user.

Second Embodiment

In the first embodiment, an altered image file with MAC is recorded on the same recording medium of the original of the image file, however, the present invention is not limited to the arrangement. For example, it may be arranged such that the altered image file with MAC is recorded in a recording medium different from that of the original of the image file. In this case, the image sensing apparatus 10A is connectable with two recording media.

Further, the altered image file with MAC may be recorded in the same folder of the original of the image file. In this case, the image sensing apparatus 10A avoids giving the completely same file name as that of the original of the image file to the altered image file with MAC.

Similarly, in the first embodiment, an altered image file with digital signature is recorded on the same recording medium of the original of the image file, however, the present invention is not limited to the arrangement. For example, it may be arranged such that the altered image file with digital signature is recorded in a recording medium different from that of the original of the image file. In this case, the image sensing apparatus 10B is connectable with two recording media.

Further, the altered image file with digital signature may be recorded in the same folder of the original of the image file. In this case, the image sensing apparatus 10B avoids giving the completely same file name as that of the original of the image file to the altered image file with digital signature.

Further, in the first embodiment, it may be arranged such that it is authenticated whether or not an image file with MAC has been altered before the additional information (thumbnail image, date of image sensing, shutter speed, aperture value, ISO sensitivity, size, model name, product number and the like), file name and size of the image file with MAC are displayed, and in accordance with the result of authentication, the display format of the additional information of the image file with MAC is changed to the first, second or third display format.

Similarly, in the first embodiment, it may be arranged such that it is authenticated whether or not an image file with digital signature has been altered before the additional information (thumbnail image, date of image sensing, shutter speed, aperture value, ISO sensitivity, size, model name, product number and the like), file name and size of the image file with digital signature are displayed, and in accordance with the result of authentication, the display format of the additional information of the image file with digital signature is changed to the first, second or third display format.

Third Embodiment

Figure 5:
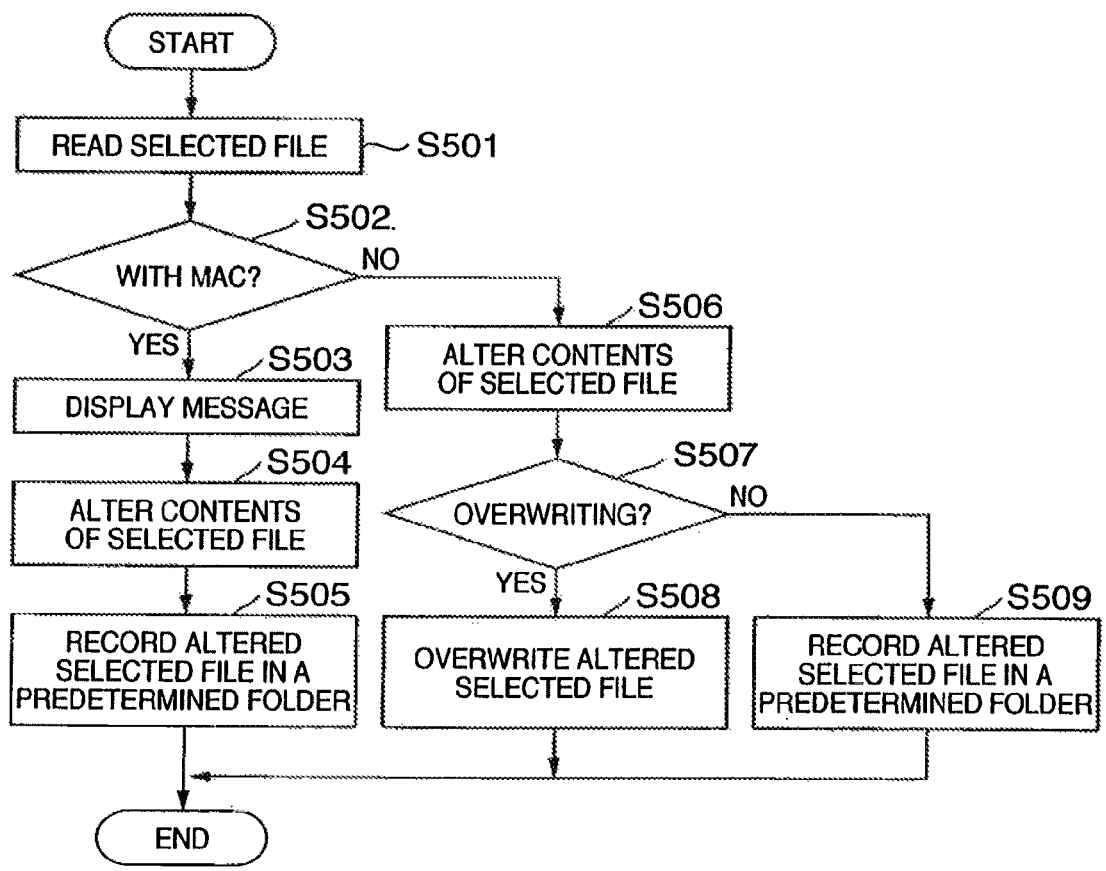
FIG. 5 is a flowchart showing alteration processing performed in an image sensing apparatus 10A.

In the first embodiment, the alteration processing shown in FIG. 5 is performed in the image sensing apparatus 10A, however, the present invention is not limited to this arrangement. For example, the alteration processing shown in FIG. 5 may be performed in other image processing apparatus (for example, the image sensing apparatus 10B or the image authentication apparatus) than the image sensing apparatus 10A.

Figure 9:
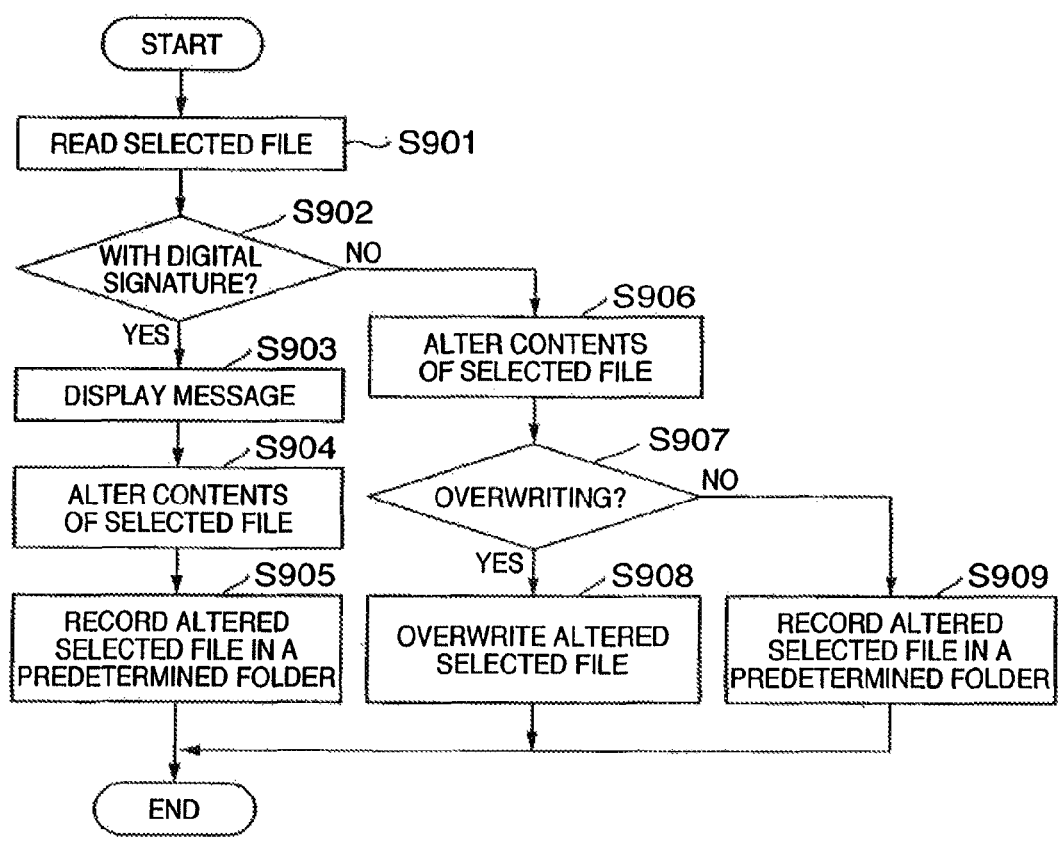
FIG. 9 is a flowchart showing alteration processing performed in the image sensing apparatus 10B.

Similarly, in the first embodiment, the alteration processing shown in FIG. 9 is performed in the image sensing apparatus 10B, however, the present invention is not limited to this arrangement. For example, the alteration processing shown in FIG. 9 may be performed in other image processing apparatus than the image sensing apparatus 10B.

Other Embodiment

The present invention includes a case where the object of the present invention can be also achieved by providing software program code to realize functions of the above-described embodiments to a computer of an apparatus or a system connected with respective devices to realize the functions of the above-described embodiments, and causing the respective devices in accordance with the program stored in the computer (CPU or MPU) of the system or the apparatus.

Further, in this case, the software program code itself realizes the functions of the above-described embodiments, and the program code itself constitutes the present invention. As a transmission medium of the program code, a communication medium (a wire circuit such as an optical fiber, a radio circuit or the like) in a computer network (a LAN, a WAN such as the Internet, a radio communication network or the like) system can be used for providing program information as a carrier wave.

Further, means for supplying the program code to the computer, for example, a recording medium holding the program code, constitutes the present invention. As such recording medium holding the program code, a flexible disk, a hard disk, an optical disk, an magneto-optical disk, a CD-ROM, a magnetic tape, a nonvolatile memory card, a ROM or the like can be used.

Further, besides the functions of the above-described embodiments are realized by executing the supplied program by a computer, the present invention includes a case where the functions of the above-described embodiments are realized with the program code in cooperation with an OS (Operating System) or other application software or the like working on the computer.

Furthermore, the present invention also includes a case where, after the supplied program code is stored in a memory of a function expansion board which is inserted into the computer or in a memory provided in a function expansion unit which is connected to the computer, a CPU or the like contained in the function expansion board or the function expansion unit performs a part or entire actual process in accordance with designations of the program code and realizes the functions of the above embodiments.

Note that the shapes and structures of the respective elements shown in the above-described embodiments are merely given as an example of implementation of the present invention, and the technical scope of the present invention is not limitedly interpreted with these shapes and structures. That is, the present invention can be implemented in various forms without departing from its sprit and its principal features.

As described above, according to the present invention, an image file with authentication data can be altered in accordance with a user's instruction.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
a processor that alters a first image file stored in a removable storage medium to generate a second image file,
wherein the processor stores the second image file in the removable storage medium without deleting the first image file from the removable storage medium if the first image file includes authentication data that is used to authenticate whether or not the first image file has been altered,
wherein the processor inquires whether or not to overwrite the first image file stored in the removable storage medium with the second image file if the first image file does not include the authentication data,
wherein the processor overwrites the first image file stored in the removable storage medium with the second image file if a user selects to overwrite the first image file stored in the removable storage medium with the second image file, and
wherein the processor stores the second image file in a predetermined folder without overwriting the first image file stored in the removable storage medium with the second image file if the user selects not to overwrite the first image file stored in the removable storage medium with the second image file.

2. The image processing apparatus according to claim 1, wherein if the first image file includes the authentication data, the second image file is stored in the same folder as a folder in which the first image file is stored.

3. The image processing apparatus according to claim 1, wherein if the first image file includes the authentication data, the second image file is stored in a folder different from a folder in which the first image file is stored.

4. The image processing apparatus according to claim 1, wherein a part of a file name of the second image file is the same as a part of a file name of the first image file.

5. The image processing apparatus according to claim 1, wherein the image processing apparatus is an image sensing device.

6. The image processing apparatus according to claim 1, wherein the predetermined folder is different from a folder in which the first image file is stored.

7. The image processing apparatus according to claim 1, wherein the authentication data included in the first image file is generated using a common key in a common key encryption system.

8. The image processing apparatus according to claim 1, wherein the authentication data included in the first image file is a digital signature generated from a digital image of the first image file.

9. A non-transitory recording medium storing a computer program for causing a computer to act as the image processing apparatus according to claim 1.

10. A method of controlling an image processing apparatus, comprising:
a step of altering a first image file stored in a removable storage medium to generate a second image file;
a step of storing the second image file in the removable storage medium without deleting the first image file from the removable storage medium if the first image file includes authentication data that is used to authenticate whether or not the first image file has been altered;
a step of inquiring whether or not to overwrite the first image file stored in the removable storage medium with the second image file if the first image file does not include the authentication data;
a step of overwriting the first image file stored in the removable storage medium with the second image file if a user selects to overwrite the first image file stored in the removable storage medium with the second image file; and
a step of storing the second image file in a predetermined folder without overwriting the first image file stored in the removable storage medium with the second image file if the user selects not to overwrite the first image file stored in the removable storage medium with the second image file.

11. The method according to claim 10, wherein if the first image file includes the authentication data, the second image file is stored in the same folder as a folder in which the first image file is stored.

12. The method according to claim 10, wherein if the first image file includes the authentication data, the second image file is stored in a folder different from a folder in which the first image file is stored.

13. The method according to claim 10, wherein a part of a file name of the second image file is the same as a part of a file name of the first image file.

14. The method according to claim 10, wherein the image processing apparatus is an image sensing device.

15. The method according to claim 10, wherein the predetermined folder is different from a folder in which the first image file is stored.

16. The method according to claim 10, wherein the authentication data included in the first image file is generated using a common key in a common key encryption system.

17. The method according to claim 10, wherein the authentication data included in the first image file is a digital signature generated from a digital image of the first image file.

18. A non-transitory recording medium storing a computer program for realizing, by a computer, the method according to claim 10.

19. An image processing apparatus comprising:
an alteration means for altering a first image file stored in a removable storage medium to generate a second image file; and
a storing means for storing the second image file in the removable storage medium without deleting the first image file from the removable storage medium if the first image file includes authentication data that is used to authenticate whether or not the first image file has been altered,
wherein the image processing apparatus inquires whether or not to overwrite the first image file stored in the removable storage medium with the second image file if the first image file does not include the authentication data,
wherein the storing means overwrites the first image file stored in the removable storage medium with the second image file if a user selects to overwrite the first image file stored in the removable storage medium with the second image file, and
wherein the storing means stores the second image file in a predetermined folder without overwriting the first image file stored in the removable storage medium with the second image file if the user selects not to overwrite the first image file stored in the removable storage medium with the second image file.

20. The image processing apparatus according to claim 19, wherein if the first image file includes the authentication data, the second image file is stored in the same folder as a folder in which the first image file is stored.

21. The image processing apparatus according to claim 19, wherein if the first image file includes the authentication data the second image file is stored in a folder different from a folder in which the first image file is stored.

22. The image processing apparatus according to claim 19, wherein a part of a file name of the second image file is the same as a part of a file name of the first image file.

23. The image processing apparatus according to claim 19, wherein the image processing apparatus is an image sensing device.

24. The image processing apparatus according to claim 19, wherein the predetermined folder is different from a folder in which the first image file is store.

25. The image processing apparatus according to claim 19, wherein the authentication data included in the first image file is generated using a common key in a common key encryption system.

26. The image processing apparatus according to claim 19, wherein the authentication data included in the first image file is a digital signature generated from a digital image of the first image file.

27. A non-transitory recording medium storing a computer program for causing a computer to act as the image processing apparatus according to claim 19.

* * * * *